US010993269B2

(12) United States Patent
Choi et al.

(10) Patent No.: US 10,993,269 B2
(45) Date of Patent: Apr. 27, 2021

(54) PREAMBLE SIGNAL DETECTION METHOD IN WIRELESS COMMUNICATION SYSTEM AND DEVICE THEREFOR

(71) Applicant: Samsung Electronics Co., Ltd., Gyeonggi-do (KR)

(72) Inventors: Soongyoon Choi, Gyeonggi-do (KR); Ikbeom Lee, Gyeonggi-do (KR); Joohyun Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/465,422

(22) PCT Filed: Mar. 14, 2017

(86) PCT No.: PCT/KR2017/002727
§ 371 (c)(1),
(2) Date: May 30, 2019

(87) PCT Pub. No.: WO2018/101544
PCT Pub. Date: Jun. 7, 2018

(65) Prior Publication Data
US 2020/0008243 A1    Jan. 2, 2020

(30) Foreign Application Priority Data

Dec. 2, 2016  (KR) .................... 10-2016-0163738
Feb. 10, 2017  (KR) .................... 10-2017-0018600

(51) Int. Cl.
*H04W 74/08*    (2009.01)
*H04L 27/26*    (2006.01)
(Continued)

(52) U.S. Cl.
CPC ...... *H04W 74/0833* (2013.01); *H04B 17/318* (2015.01); *H04B 17/345* (2015.01);
(Continued)

(58) Field of Classification Search
CPC ............ H04W 74/0833; H04W 72/082; H04L 27/2692; H04L 27/2695; H04B 17/345; H04B 17/318
See application file for complete search history.

(56) References Cited

U.S. PATENT DOCUMENTS 9,608,678 B1 *    3/2017  Sun .......................... H04B 1/10
2001/0008524 A1 *    7/2001  Ishii ..................... H04B 1/7097
370/335

(Continued)

FOREIGN PATENT DOCUMENTS

JP    2013005299    1/2013

OTHER PUBLICATIONS

PCT/ISA/210 Search Report issued on PCT/KR2017/002727, pp. 5.
PCT/ISA/237 Written Opinion issued on PCT/KR2017/002727, pp. 6.

*Primary Examiner* — Ajay Cattungal
(74) *Attorney, Agent, or Firm* — The Farrell Law Firm, P.C.

(57) ABSTRACT

The present invention relates to a preamble signal detection method of a receiving device, and a device therefor. A preamble signal detection method of a receiving device, according to one embodiment of the present disclosure, can comprise the steps of: receiving a plurality of preamble signals for random access through a physical random access channel (PRACH); determining at least one preamble signal corrupted by an interference signal among the received plurality of preamble signals; combining the remaining preamble signals excluding the at least one corrupted preamble signal among the plurality of preamble signals; and detecting a peak value of the combined preamble signals. The study was performed with the support of the "Governmental Department Giga KOREA Business" of the Ministry of Science, ICT and Future Planning.

13 Claims, 7 Drawing Sheets

(51) Int. Cl.
    *H04B 17/345*   (2015.01)
    *H04W 72/08*    (2009.01)
    *H04B 17/318*   (2015.01)

(52) U.S. Cl.
    CPC ...... *H04L 27/2692* (2013.01); *H04L 27/2695* (2013.01); *H04W 72/082* (2013.01)

(56) References Cited

U.S. PATENT DOCUMENTS

| | | | |
|---|---|---|---|
| 2007/0172000 A1* | 7/2007 | Hamamoto | H04L 27/34 375/324 |
| 2008/0062935 A1 | 3/2008 | Nakagawa et al. | |
| 2008/0298292 A1* | 12/2008 | Jang | H04W 24/00 370/311 |
| 2010/0158050 A1* | 6/2010 | Yang | H04L 27/2647 370/498 |
| 2012/0003978 A1* | 1/2012 | Lim | H04W 48/20 455/436 |
| 2012/0196561 A1* | 8/2012 | Yu | H04W 76/19 455/404.2 |
| 2013/0148620 A1 | 6/2013 | Nanri et al. | |
| 2015/0215968 A1 | 7/2015 | Jiang et al. | |
| 2015/0289080 A1 | 10/2015 | Wu | |
| 2016/0119887 A1 | 4/2016 | Charipadi et al. | |
| 2017/0201397 A1* | 7/2017 | Wang | H04W 74/0833 |

* cited by examiner

PREAMBLE SIGNAL DETECTION METHOD IN WIRELESS COMMUNICATION SYSTEM AND DEVICE THEREFOR

PRIORITY

This application is a National Phase Entry of PCT International Application No. PCT/KR2017/002727 which was filed on Mar. 14, 2017, and claims priority to Korean Patent Application Nos. 10-2016-0163738 and 10-2017-0018600, which were filed on Dec. 2, 2016 and Feb. 10, 2017, respectively, the content of each of which is incorporated herein by reference.

TECHNICAL FIELD

The disclosure relates to a method for detecting a preamble signal for random access at a receiving device of a wireless communication system and to a device therefor.

The study was performed with the support of the "Governmental Department Giga KOREA Business" of the Ministry of Science, ICT and Future Planning.

BACKGROUND ART

In order to satisfy the increasing demands of radio data traffic after the commercialization of a 4th-generation (4G) communication system, efforts have been made to develop an advanced 5th-generation (5G) communication system or a pre-5G communication system. For this reason, the 5G communication system or the pre-5G communication system is also referred to as a beyond-4G network communication system or a post long term evolution (post LTE) system.

As three main use cases of the 5G communication system, the communication industry including the International Telecommunication Union (ITU) and the 3rd Partnership Project (3GPP) is proposing enhanced mobile broadband (eMB), ultra-reliable and low-latency communications (URLLC), and massive machine type communication.

The implementation of the 5G communication system is being considered in a super-high frequency (mmWave) band (e.g., about a 60 GHz band). Also, in order to obviate a propagation loss of a radio wave and increase a delivery distance of a radio wave in the super-high frequency band, discussions for the 5G communication system are underway about various techniques such as a beamforming, a massive MIMO, a full dimensional MIMO (FD-MIMO), an array antenna, an analog beam-forming, and a large scale antenna.

Additionally, in the 5G communication system, technical developments are being made such as an advanced small cell, a cloud radio access network (cloud RAN), an ultra-dense network, a device to device (D2D) communication, a wireless backhaul, a moving network, a cooperative communication, coordinated multi-points (CoMP), a reception-end interference cancellation, and the like.

Also, in the 5G communication system, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

Additionally, in the 3GPP standard, the standardization of machine type communication (MTC) and enhanced MTC (eMTC) are being discussed in consideration of a situation in which an Internet of things (IoT) device (hereinafter referred to as a terminal) communicates with a base station or other device. For the purpose of a cost reduction, the MTC standardization in the LTE Release 12 version is discussing techniques associated with a reduction of the maximum bandwidth, a use of single receive RF chain, a reduction of peak rate, and a half duplex operation. In addition, the eMTC standardization in LTE Release 13 version is discussing techniques for cost reduction, which are not reflected in the LTE Release 12 version, and techniques for coverage enhancement.

Meanwhile, in the 3GPP standard, a ranging procedure is defined for a terminal to perform random access to a base station or another device so as to support the MTC standard or the eMTC standard. In this case, the terminal transmits a preamble signal for random access to a base station through a physical random access channel (PRACH), thereby completing a wireless network access process according to uplink synchronization.

DISCLOSURE OF INVENTION

Technical Problem

When a preamble signal is transmitted from the terminal to the base station, the preamble signal may be repeatedly transmitted.

The base station may combine the repeated preamble signals and determine a time offset of the preamble signals, based on a peak value of the preamble signals.

In this case, a situation may occur in which the performance of detecting the preamble signals is degraded due to contamination of some preamble signals caused by interference with signals of other channels.

Therefore, the disclosure is to prevent or mitigate the degradation of detection performance of a preamble signal due to an interference signal.

In addition, the technical problem to be solved in the disclosure is not limited to the above, and any other technical problem which is not mentioned can be clearly understood from the following description by a person skilled in the art.

Solution to Problem

According to an embodiment of the disclosure, a preamble signal detection method of a receiving device in a wireless communication system may include receiving a plurality of preamble signals for random access through a physical random access channel (PRACH), determining at least one preamble signal contaminated by an interference signal among the received plurality of preamble signals, combining remaining preamble signals excluding the at least one contaminated preamble signal among the plurality of preamble signals, and detecting a peak value of the combined preamble signals.

According to another embodiment of the disclosure, a receiving device detecting a preamble signal in a wireless communication system may include a receiver configured to receive a plurality of preamble signals for random access through a physical random access channel (PRACH), an interference signal checker configured to determine at least one preamble signal contaminated by an interference signal among the received plurality of preamble signals, a combiner configured to combine remaining preamble signals excluding the at least one contaminated preamble signal among the plurality of preamble signals, and a peak detector configured to detect a peak value of the combined preamble signals.

According to still another embodiment, a computer-readable non-transitory recording medium may store a program that enables the receiving device of the disclosure to perform operations of receiving a plurality of preamble signals for random access through a PRACH, determining at least one preamble signal contaminated by an interference signal among the received plurality of preamble signals, combining remaining preamble signals excluding the at least one contaminated preamble signal among the plurality of preamble signals, and detecting a peak value of the combined preamble signals.

Advantageous Effects of Invention

According to an embodiment of the disclosure, the detection performance of a preamble signal for ranging access can be improved, and thus a call connection delay, which may be a problem in case of degraded detection performance, can be minimized.

Also, the disclosure may be more useful in a small-cell environment with much interference according to the enhanced machine type communication (eMTC) standard, and may be utilized in a narrow band (NB) internet of things (IoT) environment as a similar environment.

Besides, effects obtainable or predicted by embodiments of the disclosure will be explicitly or implicitly disclosed in the detailed description of the following embodiments. For example, various effects to be predicted according to embodiments of the disclosure will be disclosed in the detailed description given below.

MODE FOR THE INVENTION

Figure 1:
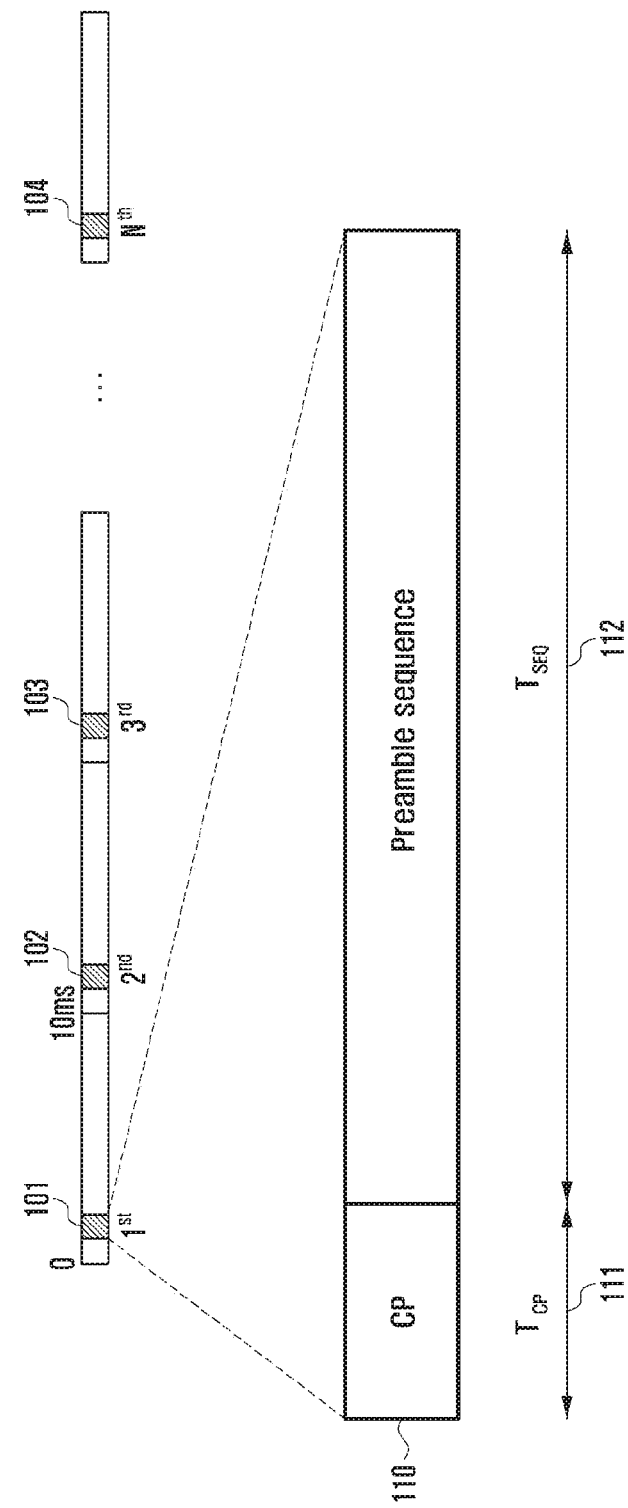
FIG. 1 is a diagram illustrating a situation in which a plurality of preamble signals are repeatedly transmitted.

Now, embodiments of the present disclosure will be described in detail with reference to the accompanying drawings. In the following description of this disclosure, detailed description of known functions and configurations will be omitted when it may make the subject matter of the present disclosure rather unclear. The terms used herein are defined in consideration of functions in one embodiment of the present disclosure, and may be changed according to the intention of the user, the operator, or the like. Therefore, the definition should be based on the contents throughout this specification.

In addition, singular expressions such as "a/an" and "the" may include plural expressions unless the context clearly dictates otherwise. For example, "a component surface" includes one or more component surfaces.

In addition, expressions including ordinal numbers such as "first" and "second" may indicate various elements. The above expressions do not limit the sequence or importance of the elements, and are used merely for the purpose to distinguish one element from the others. For example, without departing from the scope of the present disclosure, a first element may be referred to as a second element, and similarly a second element may be also referred to as a first element. The term "and/or" includes a combination of a plurality of specified items or any of a plurality of specified items.

Terms used herein may be merely to describe a certain embodiment, and may not be intended to limit the disclosure. The singular expressions may include plural expressions unless the context clearly dictates otherwise. In this disclosure, the terms such as "comprise", "include", and "have" denote the presence of stated elements, components, operations, functions, features, and the like, but do not exclude the presence of or a possibility of addition of one or more other elements, components, operations, functions, features, and the like.

In addition, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like When a first element is referred to as being "connected" or "coupled" (operatively or communicatively) to a second element, it may mean that the first element is connected or coupled directly to the second element or indirectly through any other element (e.g., a third element).

Terms used herein, including technical or scientific terms, may have the same meaning as commonly understood by those skilled in the art. Some terms defined in a normal dictionary may be interpreted as having the same or similar meaning as the contextual meanings in the related art. Certain terms are not to be construed as an ideal or overly formal detect unless expressly defined to the contrary herein. In some cases, the terms defined herein cannot be construed to exclude embodiments of the present disclosure.

Before the detailed description of the disclosure, some terms used herein are explained exemplarily. However, the meanings of terms are not limited to such examples.

A base station is an entity that communicates with a terminal, and may be referred to as a BS, a NodeB (NB), an evolved NodeB (eNodeB, eNB), an access point (AP), or the like.

A terminal (or user equipment) is an entity that communicates with a base station or any other terminal, and may be referred to as a node, a UE, a mobile station (MS), a mobile equipment (ME) a device, or the like. The terminal may be an IoT device and may also be an MTC terminal that conforms to the MTC or eMTC standard.

In the disclosure, a transmitting device of a wireless communication system may be an apparatus that transmits a preamble signal through a physical random access channel (PRACH) which is a physical channel. Also, a receiving device of the wireless communication system may be an apparatus that receives the preamble signal.

For example, the transmitting device may be a terminal, and the receiving device may be a base station. However, any apparatus may be the receiving device or the transmitting device, depending on its role of transmitting or receiving a preamble signal. In case of two terminals, a terminal that transmits a preamble signal may be the transmitting device, and a terminal that receives the preamble signal may be a receiving device.

In order to support the MTC standard in the 3GPP standard, preamble formats for transmission via the RACH may be defined as shown in Table 1.

TABLE 1

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |
| (frame structure type 2 only) | | |

The transmitting device may repeatedly transmit a preamble signal through the PRACH, which is an uplink physical channel, in accordance with the preamble format. At this time, the preamble format 4 may be excluded from the repeated transmission.

FIG. 1 is a diagram illustrating a situation in which a plurality of preamble signals are repeatedly transmitted.

Referring to FIG. 1, a plurality of preamble signals 101, 102, 103 and 104 may be repeatedly transmitted. In a transmitting device, the number of times of repetition of the preamble signal may be once, twice, 4 times, 8 times, 16 times, 32 times, 64 times, or 128 times, for example. The transmitting device may repeatedly transmit the preamble signal every 10 milliseconds (ms) or 20 ms by synchronizing it with a subframe allocated to each cell.

As indicated by 110 in FIG. 1, the preamble signal 101 may include a cyclic prefix (CP) section 111, which is a guard interval as a guard sample, and a preamble sequence section 112. In this case, the lengths of the CP section 111 and the preamble sequence section 112 may comply with the preamble formats of Table 1 described above.

A receiving device may receive and detect a preamble signal. Detecting the preamble signal may mean receiving a preamble signal and determining a time offset based on a peak value of the received preamble signal.

The receiving device may determine a correction time value for correction of a data transmission time point of the transmitting device, based on the determined time offset. Then, the receiving device may insert the determined correction time value in a random access response (RAR) signal, which is a response signal of the preamble signal, and transmit it to the transmitting device.

When a preamble signal is repeatedly received for several tens of ms to several thousands of ms, the receiving device may combine and detect a plurality of preamble signals 101 to 104. When detecting the plurality of preamble signals 101 to 104, the receiving device may detect a preamble signal even at a lower signal-to-noise ratio (SNR). For example, if the detection is possible at about 20 dB when the number of repetitions of a preamble signal is one, the detection may be possible even at about 3 dB when the number of repetitions of a preamble signal is 128.

Figure 2:
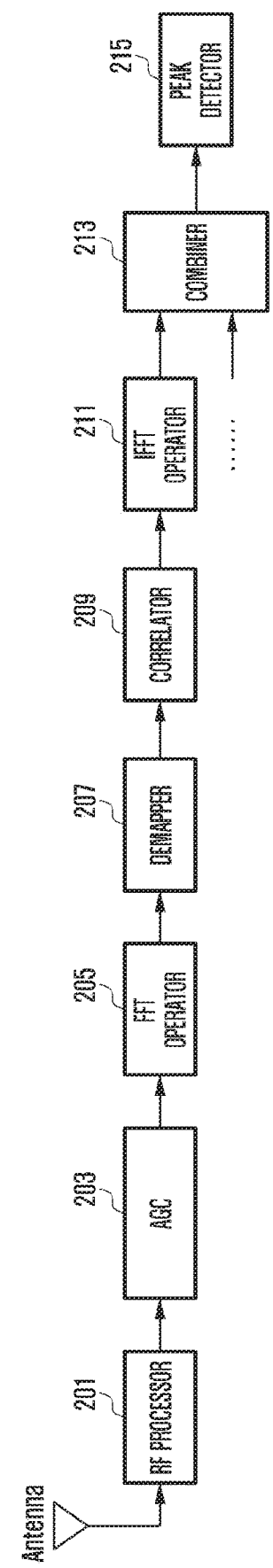
FIG. 2 is a block diagram of a receiving device for detecting a preamble signal.

FIG. 2 is a block diagram of a receiving device for detecting a preamble signal.

Referring to FIG. 2, the receiving device 200 includes a radio frequency (RF) processor 201, an automatic gain control (AGC) 203, a fast Fourier transform (FFT) operator 205, a demapper 207, a correlator 209, an inverse fast Fourier transform (IFFT) operator 211, a combiner 213, and a peak detector 215. In this case, the receiving device 200 may be, for example, a base station.

The RF processor 201 includes a filter, a frequency converter, and the like. The RF processor 201 converts a signal of a radio frequency (RF) band, received through a receiving antenna, into a baseband signal and outputs the baseband signal.

The AGC 203 relieves the amplitude distortion of the received signal caused by a power change of the receiving device, fluctuation of a distance between the receiving device and the transmitting device, interference by obstacles, a movement of the transmitting device, and an environmental variation around the transmitting device, and then outputs the baseband processed signal at a constant amplitude level.

The FFT operator 205 converts the received signal into a frequency domain signal.

The demapper 207 extracts a preamble signal from the frequency domain signal and outputs the preamble signal.

The correlator 209 performs correlation on the preamble signals.

The IFFT operator 211 converts the correlated preamble signal into a time domain signal.

The combiner 213 may combine a plurality of preamble signals repeatedly received. That is, the combiner 213 may accumulate the powers of a plurality of sync signals in the time domain corresponding to the respective preamble signals. Alternatively, when there are two or more antennas, the combiner 213 may combine a plurality of preamble signals received through the respective antennas. In this case, according to an embodiment, the combiner 213 may combine the preamble signals from which the CP section which is the guard interval is removed.

The peak detector 215 compares a peak value of the accumulated powers with a threshold (value). In case of a value in a specific range, the peak detector 215 may determine the received signal to be a preamble signal transmitted by a terminal (or transmitting device), and then determine a time offset based on a time point when the peak value occurs. Next, based on the determined time offset, the peak detector 215 may determine a correction time value for correction of a data transmission time point of the transmitting device.

A transmitter (not shown) may insert the determined correction time value in a random access response (RAR) signal, which is a response signal of the preamble signal, and then transmit the RAR signal to the transmitting device.

Meanwhile, a process of detecting a preamble signal by the receiving device 200 of FIG. 2 may be expressed by Equations.

Considering the number of transmitting devices (e.g., terminals) which can be covered per cell by a receiving device (e.g., a base station), for example, when 64 preambles, $S_u$, exist per cell, the transmitting device is capable of randomly and repeatedly transmitting one preamble, v, among 64 preambles. As described above, the number of times of repeated transmission of the transmitting device may be N times between once and 128 times.

The receiving device 200 that receives a preamble signal from the transmitting device may perform, at the correlator

209, correlation between a received signal, $y_k$, of the $k^{th}$ subcarrier and each of 64 preambles, $S_{u,k}$, in consideration of the length of the preamble as shown in Equation 1 below. Then, the IFFT operator 211 may convert the result of correlation into a value in the time domain.

$$Z_{u,k} = y_k S_{u,k}^* = h_k S_{v,k} S_{u,k}^* + n_k S_{u,k}^*, \quad u=0, \ldots 63,$$
$$k=0, \ldots, 838 \quad \text{[Equation 1]}$$

Next, the receiving device 200 may accumulate, at the combiner 213, the outputs of the time domain values as shown in Equation 2 or Equation 3 below. That is, the combiner 213 may accumulate the outputs of the preamble signals repeatedly transmitted N times, thereby obtaining the maximum value $p_u$.

Equation 2 represents a scheme of accumulating output powers (a non-coherent scheme), and Equation 3 represents a combination of a scheme of accumulating output values in the time domain (a coherent scheme) and the above scheme of accumulating output powers.

The peak detector 215 compares the maximum value, $p_u$, with a detection threshold (TH). In case of a value in a specific range, the peak detector 215 may determine that the preamble signal has been transmitted by the terminal.

$$(p_u, \hat{n}_u) = \max_n \sum_{r=1}^{N} \left| \sum_{k=0}^{N_{FFT}-1} Z_{u,k} e^{j\frac{2\pi k n}{N_{FFT}}} \right|^2 \quad \text{[Equation 2]}$$

$$(p_u, \hat{n}_u) = \max_n \sum_{r_p=1}^{N_P} \left| \sum_{r_c=1}^{N_c} \sum_{k=0}^{N_{FFT}-1} Z_{u,k} e^{j\frac{2\pi k n}{N_{FFT}}} \right|^2, N_p + N_c = N \quad \text{[Equation 3]}$$

Meanwhile, when a plurality of preamble signals repeatedly transmitted are detected, some preamble signals may be deteriorated due to, for example, interference of a legacy terminal because the preamble signals are repeatedly transmitted for several tens of ms to several ms.

According to the eMTC standard, a preamble signal transmitted to be suitable for a small cell may have low power. On the other hand, legacy signals of other channels may have a high signal-to-noise ratio.

Specifically, in a situation where the receiving device repeatedly transmits the preamble signals 128 times at intervals of 10 ms, up to 128 preamble signals are accumulated for about 1.28 seconds. In this case, a legacy interference signal may exist in some subframes within about 1.28 seconds, thereby causing the degradation of detection performance.

Therefore, it may be difficult to determine whether the preamble signal is an interference signal or a signal for random access.

In addition, even when an interface rejection combining (IRC) is used, the estimation performance of the PRACH is degraded due to a low signal-to-noise ratio, thus obtaining a small IRC gain and increasing only complexity.

Also, in case of an interference signal having a high signal-to-noise ratio, a number of signals exceeding a threshold may be detected, thus increasing the rate of false alarms and wasting call connection resources. In this case, there may be a way to reduce the false alarms by increasing the threshold, but the detection performance which is in a trade off relationship may be relatively lowered.

In other words, if some subframes are affected by an interference signal in a process of repeatedly transmitting a plurality of preamble signals in synchronization with a plurality of subframes, a legacy terminal has only to perform retransmission in the next radio frame. However, in case of a preamble signal that complies with the eMTC standard, the overall performance may be degraded because a preamble signal contaminated by an interference signal is combined together. In this case, a situation may occur in which a preamble signal is transmitted again after a maximum of several milliseconds, so that a call connection delay may be increased.

Figure 3:
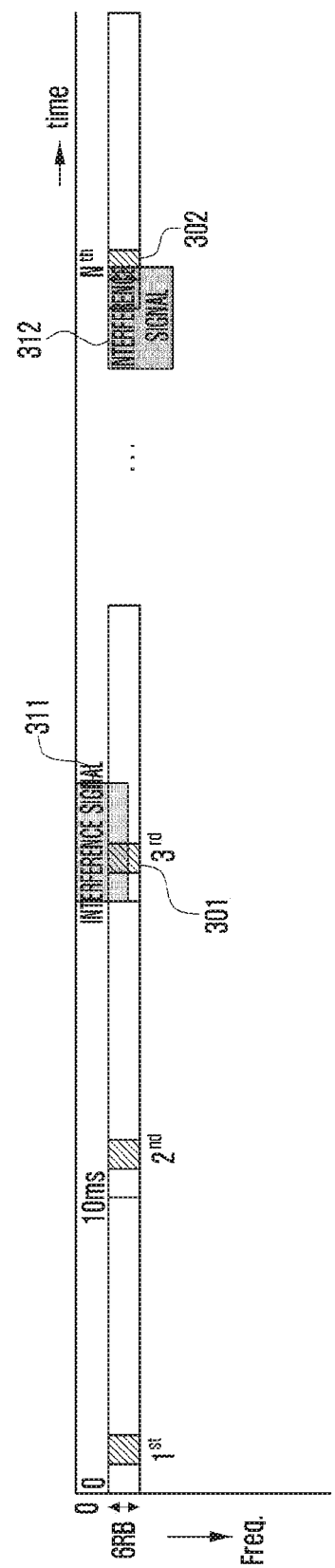
FIG. 3 is a diagram illustrating a situation in which interference occurs in a process of repeatedly transmitting a preamble signal.

FIG. 3 is a diagram illustrating a situation in which interference occurs in a process of repeatedly transmitting a preamble signal.

In FIG. 3, the x-axis represents a time axis, and the y-axis represents a frequency band. Referring to FIG. 3, the frequency band occupied by a signal through the PRACH may be approximately 6 resource blocks (RBs).

In this case, an interference signal 311 may be generated in the third preamble signal section 301. In this case, there is a high possibility that a number of signals exceeding a threshold are detected in accordance with the correlation of preamble signals and thus a false alarm occurs. Or, an interference signal 312 may be generated in the $N^{th}$ preamble signal interval 302. Here, the interference signal 312 may exist in a CP region of the $N^{th}$ preamble signal, and the influence of the interference signal 312 may be reduced by a CP region removal process, so that the $N^{th}$ transmission signal may be used for a repeated combination.

As a method for reducing the deterioration of preamble detection performance due to an interference signal without increasing complexity, there may be a method for a receiving device to exclude a subframe containing a preamble signal contaminated by the interference signal from combination.

Specifically, when the preamble signal is repeatedly transmitted up to 128 times in accordance with the MTC standard, a combined gain value of the preamble signal may be 3 dB maximally. In this case, even if one preamble signal out of 128 preamble signals is excluded from combination, a performance loss may be only −21 dB. That is, when a high interference signal is received in a specific subframe, it may be advantageous to exclude the specific subframe from combination.

Therefore, a criterion may be required to determine whether the $i^{th}$ transmitted preamble signal is contaminated by an interference signal and determine whether to use or exclude the contaminated signal when combining preamble signals.

Figure 4:
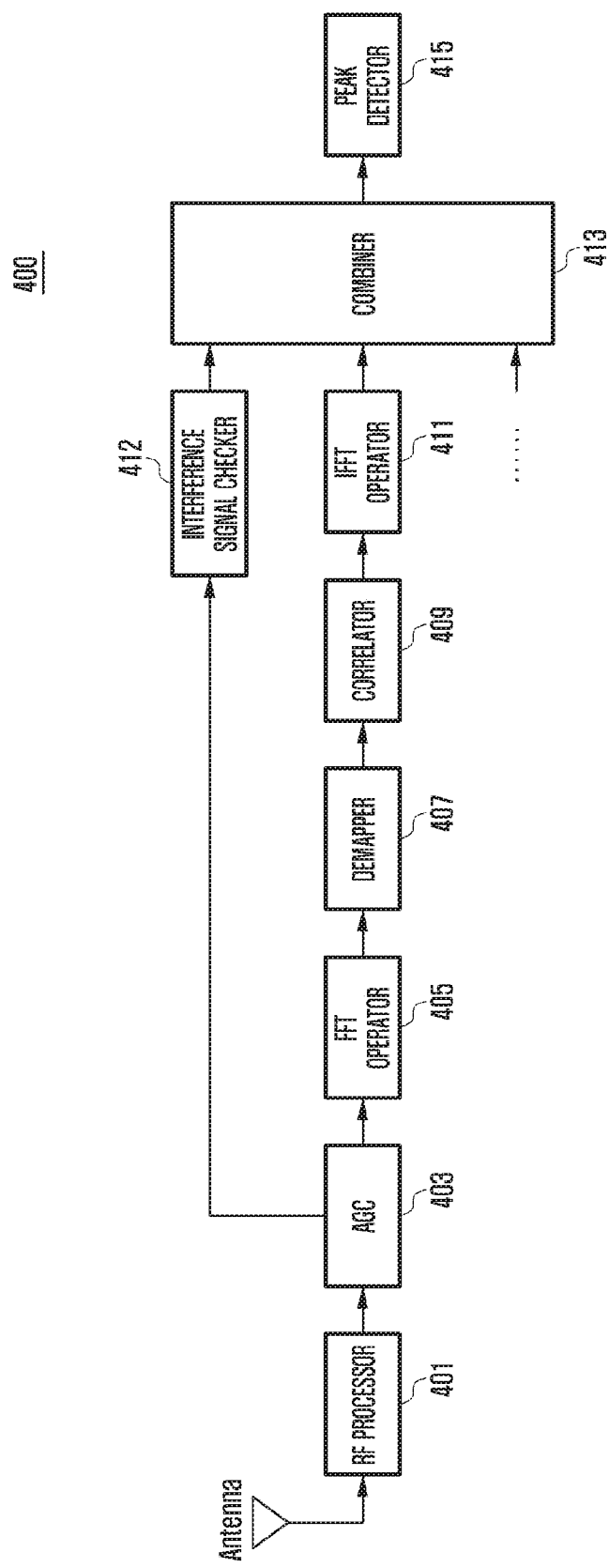
FIG. 4 is a block diagram of a receiving device for detecting a preamble signal, according to an embodiment of the disclosure.

FIG. 4 is a block diagram of a receiving device for detecting a preamble signal, according to an embodiment of the disclosure.

Referring to FIG. 4, the receiving device 400 may include an RF processor 401, an AGC 403, an FFT operator 405, a demapper 407, a correlator 409, an IFFT operator 411, a combiner 413, and a peak detector 415. In this case, the RF processor 401, the AGC 403, the FFT operator 405, the demapper 407, the correlator 409, the IFFT operator 411, the combiner 413, and the peak detector 415 correspond to the RF processor 201, the AGC 203, the FFT operator 205, the demapper 207, the correlator 209, the IFFT operator 211, the combiner 213, and the peak detector 215 in FIG. 2, respectively, so that repeated descriptions will be omitted. Meanwhile, the receiving device 400 may be, for example, a base station. The respective elements 401, 403, 405, 407, 409, 411, 413, 415, and 412 of the receiving device 400 may be implemented in a processor, a single chip, multiple chips, or a plurality of electronic components. For example, various architectures may be used for a control unit 120, including a dedicated or embedded processor, a single purpose processor, a controller, an ASIC, or the like.

The receiving device 400 of FIG. 4 may further include an interference signal checker 412. The interference signal checker 412 may be implemented as a software module or manufactured in the form of a hardware chip and then mounted in the receiving device 400. Alternatively, the interference signal checker 412 may be a part of any other element of the receiving device 400. For example, the interference signal checker 412 may be implemented as a part of the combiner 413.

In the receiving device 400 of FIG. 4, information about signal strength (e.g., received signal strength indication (RSSI)) of a preamble signal outputted from the AGC 403 may be transmitted to the interference signal checker 412. Based on the strength of the preamble signal, the interference signal checker 412 may detect whether contamination occurs due to an interference signal of any other channel. For example, a signal via the PRACH may have a negative SNR of several tens of dB due to a long sequence. In contrast, a signal via another channel such as a physical uplink shared channel (PUSCH) or a physical uplink control channel (PUCCH) may have a SNR of 0 dB or more.

Therefore, when the strength of a received preamble signal is greater than a first threshold, the AGC 403 may determine that the preamble signal is a signal contaminated by an interference signal. That is, when the strength of a subframe containing the $i^{th}$ preamble signal is greater than the first threshold, the AGC 403 may determine the preamble signal as a signal contaminated by an interference signal.

In an embodiment, considering the average signal strength of repeatedly transmitted preamble signals, the interference signal checker 412 may determine that the preamble signal is a signal contaminated by an interference signal. That is, when the average signal strength of subframes containing the repeatedly transmitted preamble signals is referred to as reference RSSI, and when a difference between the signal strength of the $i^{th}$ preamble signal and the reference RSSI is greater than a second threshold, the interference signal checker 412 may remove the $i^{th}$ preamble signal from combination.

In another embodiment, the interference signal checker 412 may estimate noise from a time domain value of the $i^{th}$ preamble signal outputted from the IFFT operator 411. Then, when the strength of noise obtained by reversely compensating the estimated noise value with a gain of the ACD is greater than a third threshold, the interference signal checker 412 may determine the $i^{th}$ preamble signal as a signal contaminated by an interference signal and remove it from the combination of preamble signals.

In still another embodiment, considering the average noise strength of repeatedly transmitted preamble signals, the interference signal checker 411 may determine that the preamble signal is a signal contaminated by an interference signal. That is, when a difference between the average strength of the repeatedly transmitted preamble signals and the noise strength of the $i^{th}$ preamble signal is greater than a fourth threshold, the interference signal checker 412 may determine the $i^{th}$ preamble signal as a signal contaminated by an interference signal and remove it from the combination of preamble signals.

Meanwhile, a process of determining a contaminated signal at the receiving device 400 may be expressed by Equations.

As shown in Equation 4 below, the receiving device 400 may calculate, as a reference metric, $m_{ref,i}$, a value obtained by cumulatively averaging preamble signals smaller than a threshold, iTH1.

$$m_{ref,i} = \frac{1}{N_i} \sum_{n=1}^{i} m'_n, i = 1, \ldots, N_{repetition} \quad \text{[Equation 4]}$$

In Equation 4, $m'_n$ and $N_i$ may be expressed as Equation 5 and Equation 6, respectively.

$$m'_n = \begin{cases} 0, & 10\log_{10} m_n > iTH1 \\ m_n, & \text{otherwise} \end{cases} \quad \text{[Equation 5]}$$

$$N_i = \sum_{n=1}^{i} n'_n, n'_n = \begin{cases} 0, & 10\log_{10} m_n > iTH1 \\ 1, & \text{otherwise} \end{cases} \quad \text{[Equation 6]}$$

When a decibel value of $m_i$ of a preamble signal in Equations 5 and 6 is greater than the threshold iTH1, the $m_i$ value of the preamble signal may be excluded from the calculation of the cumulative average value of $m_{ref,i}$ values.

That is, $m_{ref,i}$ may be obtained by cumulatively averaging only preamble signals that have not been contaminated by an interference signal.

Next, based on the $i^{th}$ preamble signal strength value, and the cumulative average value, $m_{ref,i}$, of repeated preamble signals through the reference metric, the receiving device 400 may determine whether the $i^{th}$ preamble signal is a signal contaminated by an interference signal.

For example, when the $i^{th}$ preamble signal strength value, $m_i$, satisfies the following Equations 7 and 8, the receiving device 400 may determine the $i^{th}$ preamble signal as being contaminated by an interference signal and then exclude the $i^{th}$ preamble signal at the time of combining repeated preamble signals.

$$10 \log_{10} m_i > iTH1 \quad \text{[Equation 7]}$$

In Equation 7, the receiving device 400 may determine whether the decibel value of a preamble signal is greater than a threshold iTH1.

$$(10 \log_{10} m_i - 10 \log_{10} m_{ref,i}) > iTH2 \quad \text{[Equation 8]}$$

In Equation 8, the receiving device 400 may determine whether a difference between the decibel value of a preamble signal and the decibel value obtained by cumulatively averaging preamble signals is greater than a threshold iTH2.

Figure 5:
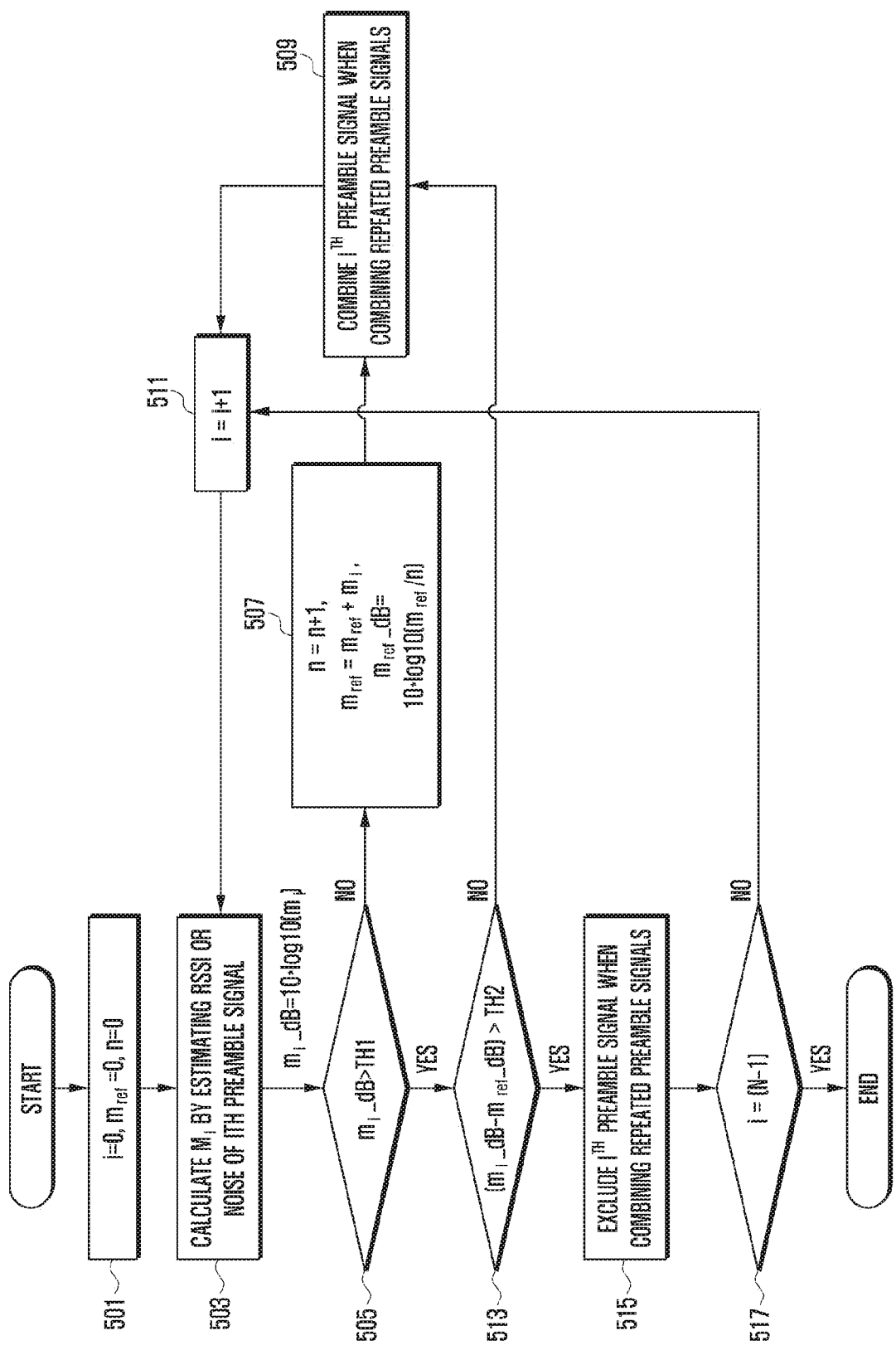
FIG. 5 is a flow diagram illustrating a process for determining whether a preamble signal is contaminated, according to an embodiment of the disclosure.

FIG. 5 is a flow diagram illustrating a process for determining whether a preamble signal is contaminated, according to an embodiment of the disclosure.

Referring to FIG. 5, at step 501, the receiving device may set initial values of i, $m_{ref}$, and n to zero.

Next, at step 503, the receiving device may calculate the value of $m_i$ by estimating the signal strength, RSSI, of the $i^{th}$ preamble signal or noise of the preamble signal.

At this time, the $m_i$ value may be expressed by $m_i\_dB = 10*\log 10 (m_i)$ in the unit of decibel (dB).

Next, at step 505, the receiving device may determine whether the decibel $m_i$ value is greater than a threshold TH1.

If the $m_i$ value is smaller than (or equal to or smaller than) the threshold TH1, the receiving device may increase the value of n by 1 and cumulatively add the calculated $m_i$ value to the $m_{ref}$ value. Then, an average value obtained by dividing the cumulatively added value by the n value may be expressed as $m_{ref}\_dB$ in the unit of decibel.

In addition, at step 509, the receiving device may combine the $i^{th}$ preamble signal together when combining repeated preamble signals.

Next, at step 511, the receiving device may increase the value of i by 1 and continue to determine whether the next $i^{th}$ preamble signal is contaminated.

Meanwhile, when it is determined at step 505 that the calculated $m_i$ value is greater than (or equal to or greater than) the threshold TH1, the receiving device may determine at step 513 whether a difference between the decibel $m_i$ value and the decibel $m_{ref}$ value exceeds a threshold TH2. If the difference is smaller than (or equal to or smaller than) the threshold TH2, the receiving device may combine the $i^{th}$ preamble signal together at step 509 when combining repeated preamble signals.

On the other hand, if it is determined at step 513 that the difference between the decibel $m_i$ value and the decibel $m_{ref}$ value is greater than (or equal to or greater than) the threshold TH2, the receiving device may exclude the $i^{th}$ preamble signal at step 515 when combining repeated preamble signals.

Next, at step 517, it may be determined whether the value of i starting from zero to indicate the order of a preamble signal reaches the N-1 value which is the total number of repeated transmissions of the preamble.

When the total number of repeated transmissions has not been reached, the receiving device may increase the value of i and continue to determine whether the next preamble signal is contaminated.

On the other hand, when the total number of repeated transmissions has been reached, the receiving device may terminate the process of determining whether a preamble signal is contaminated.

Figure 6:
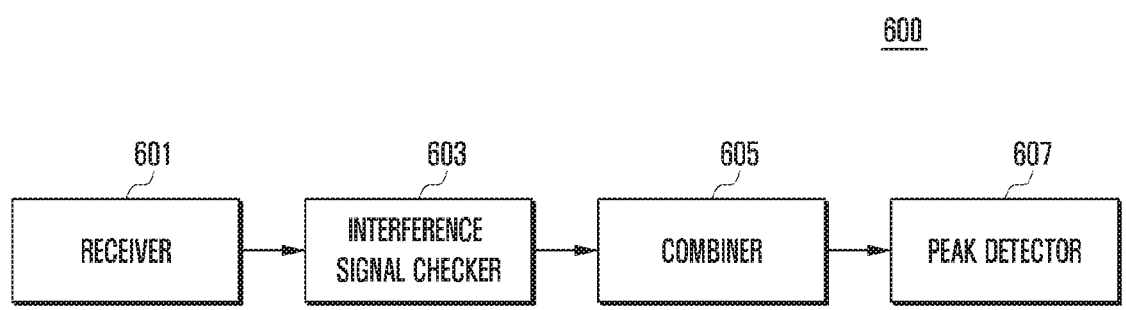
FIG. 6 is a block diagram of a receiving device for detecting a preamble signal, according to an embodiment of the disclosure.

FIG. 6 is a block diagram of a receiving device for detecting a preamble signal, according to an embodiment of the disclosure.

Referring to FIG. 6, the receiving device 600 may include a receiver 601, an interference signal checker 603, a combiner 605, and a peak detector 607.

The receiver 601 of FIG. 6 may correspond to the antenna or the RF processor 401 of FIG. 4. The interference signal checker 603, the combiner 605, and the peak detector 607 shown in FIG. 6 respectively correspond to the interference signal checker 412, the combiner 413, and the peak detector 607 shown in FIG. 4.

In FIG. 6, the interference signal checker 603, the combiner 605, and the peak detector 607 may be a part of a processor. In this case, the processor may include one or more of a central processing unit (CPU), an application processor (AP), or a communication processor (CP). The respective elements 601, 603, 605, and 607 of the receiving device 600 may be implemented in a processor, a single chip, multiple chips, or a plurality of electronic components. For example, various architectures may be used for a control unit 120, including a dedicated or embedded processor, a single purpose processor, a controller, an ASIC, or the like.

In FIG. 6, the receiver 601 may receive a plurality of preamble signals for random access through the PRACH.

The interference signal checker 603 may detect at least one preamble signal contaminated by an interference signal among the plurality of received preamble signals.

According to one embodiment, when the signal strength of a specific preamble signal among the plurality of preamble signals is greater than the first threshold, the interference signal checker 603 may determine that the specific preamble signal having the signal strength greater than the first threshold is at least one contaminated preamble signal.

According to another embodiment, the interference signal checker 603 may calculate the average signal strength of a plurality of preamble signals and determine whether a difference between the strength of a specific preamble signal among a plurality of preamble signals and the average signal strength is greater than a second threshold. If the difference between the strength of a specific preamble and the average signal strength is greater than the second threshold, the specific preamble signal may be determined as at least one contaminated preamble signal. In this case, according to an embodiment, calculating the average signal strength of the plurality of preamble signals may include calculating the average signal strength of preamble signals having the signal strength smaller than the first threshold.

According to still another embodiment, when the strength of noise of a specific preamble signal among a plurality of preamble signals is greater than a third threshold, the interference signal checker 603 may determine the specific preamble signal as at least one contaminated preamble signal.

According to yet another embodiment, the interference signal checker 603 may calculate the average noise strength of a plurality of preamble signals. When a difference between the noise strength of a specific preamble signal among the plurality of preamble signals and the average noise strength is greater than a fourth threshold, the interference signal checker 603 may determine the specific preamble signal as at least one contaminated preamble signal.

The combiner 605 may combine the remaining preamble signals except at least one contaminated preamble signal among the plurality of preamble signals.

In this case, according to an embodiment, the combiner 605 may combine the remaining preamble signals from which a cyclic prefix (CP) section which is the guard interval is removed. At this time, the CP section may be removed in advance, for example, in a CP section remover (not shown).

The peak detector 607 may detect a peak value of the combined preamble signals.

Meanwhile, the receiving device 600 may further include a transmitter (not shown). The transmitter (not shown) may insert a correction time value for correcting a data transmission time point of a transmitting device (not shown), which is determined based on the detected peak value, in an RAR signal which is a response signal of the preamble signal, and then transmit the RAR signal to the transmitting device.

Figure 7:
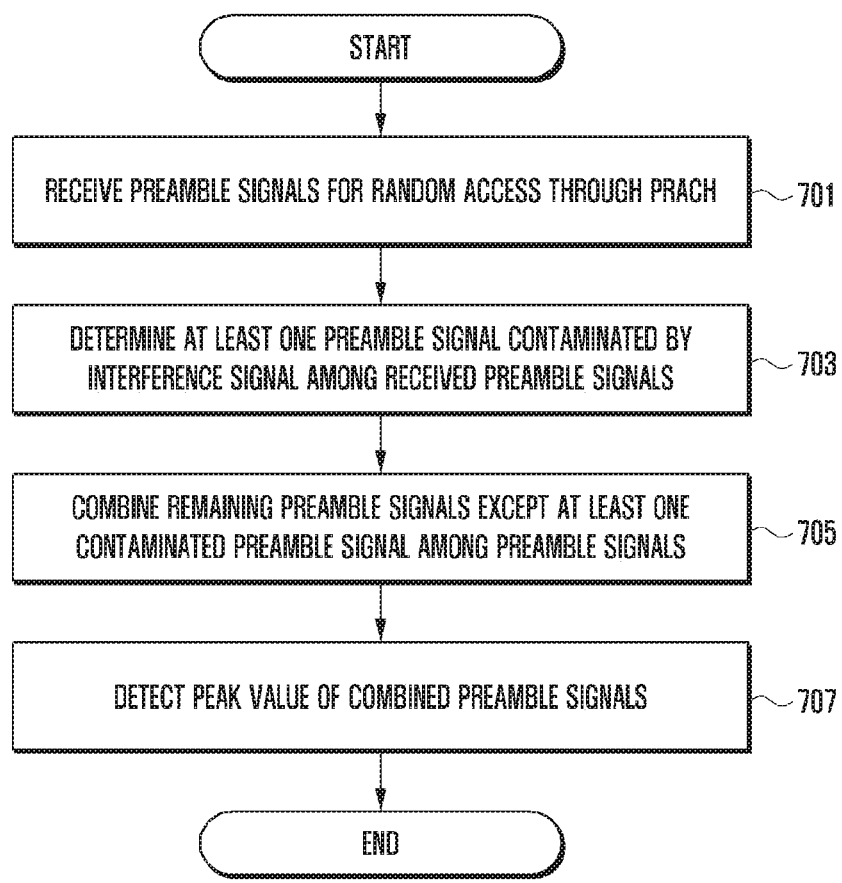
FIG. 7 is a flow diagram illustrating a process for detecting a preamble signal, according to an embodiment of the disclosure.

FIG. 7 is a flow diagram illustrating a process for detecting a preamble signal, according to an embodiment of the disclosure.

Referring to FIG. 7, at step 701, a receiving device may receive a plurality of preamble signals for random access through a PRACH.

Next, at step 703, the receiving device may determine at least one preamble signal contaminated by an interference signal among the plurality of received preamble signals.

According to one embodiment, when the signal strength of a specific preamble signal among the plurality of preamble signals is greater than a first threshold, the receiving device may determine the specific preamble signal as at least one contaminated preamble signal.

According to another embodiment, the receiving device may calculate the average signal strength of the plurality of preamble signals and, when a difference between the strength of a specific preamble signal among the plurality of preamble signals and the average signal strength is greater than a second threshold, determine the specific preamble signal as at least one contaminated preamble signal. In this case, calculating the average signal strength of the plurality of preamble signals may include calculating the average signal strength of preamble signals having the signal strength smaller than the first threshold.

According to still another embodiment, when the noise strength of a specific preamble signal among the plurality of preamble signals is greater than a third threshold, the receiving device may determine the specific preamble signal as at least one contaminated preamble signal.

According to yet another embodiment, the receiving device may calculate the average noise strength of the plurality of preamble signals and, when a difference between the noise strength of a specific preamble among the plurality of preamble signals and the average noise strength is greater than a fourth threshold, determine the specific preamble signal as at least one contaminated preamble signal.

Next, at step 705, the receiving device may combine the remaining preamble signals except the at least one contaminated preamble signal among the plurality of preamble signals.

In this case, the receiving device may combine the remaining preamble signals from which a CP section, which is a guard interval, has been removed.

Next, at step 707, the receiving device may detect a peak value of the combined preamble signals.

Meanwhile, the receiving device may insert a correction time value for correcting a data transmission time point of a transmitting device, which is determined based on the detected peak value, in an RAR signal which is a response signal of the preamble signal, and then transmit it to the transmitting device.

Although detailed operation or modification is not fully described in the embodiments of the disclosure in order to facilitate understanding, a method for combining the remaining preamble signals excluding a contaminated preamble signal may be implemented and modified in various manners as apparent to a person skilled in the art.

Furthermore, the embodiments of the disclosure are not limited to the 3GPP system and may be applicable to various wireless communication systems that perform communication through synchronization between a receiving device and a transmitting device while having a ranging procedure. For example, the embodiments of the disclosure are also applicable to wireless communication systems such as NB-IoT, V2X, and the like.

At least a part of the receiving device (e.g., modules or functions thereof) or method (e.g., operations) according to the embodiment of the disclosure may be implemented as instructions stored in the form of a program module in non-transitory computer readable media. When the instructions are executed by a processor, the processor may perform particular functions corresponding to the instructions.

The program may be stored in a computer-readable non-transitory recording medium, and then read and executed by a computer, thereby implementing the embodiments of the disclosure.

The non-transitory recording medium refers to a specific medium that semi-permanently stores data and can be read by an apparatus, and may include a volatile or nonvolatile memory, such as a register, a cache, or a buffer, which temporarily stores data for calculation or transmission. On the other hand, transitory transmission media such as signals and currents do not correspond to the non-transitory recording media.

Specifically, the above-mentioned programs may be provided by being stored in a non-transitory readable recording medium such as CD, DVD, hard disk, Blu-ray disk, USB, internal memory, memory card, ROM or RAM.

In addition, the above-mentioned programs may be stored in a memory of a server and transmitted to a terminal (e.g., the receiving device in the disclosure) connected to the server via a network or transferred to or registered in the server by a program provider (e.g., a program developer or manufacturer).

Furthermore, when the above-described programs are sold from the server to the terminal, at least a part of the programs may be temporarily generated in a buffer of the server for transmission. In this case, the buffer of the server may be the non-transitory recording medium of the disclosure.

According to an embodiment, a computer-readable non-transitory recording medium may store a program that enables the receiving device of the disclosure to perform operations of receiving a plurality of preamble signals for random access through a PRACH, determining at least one preamble signal contaminated by an interference signal among the received plurality of preamble signals, combining remaining preamble signals excluding the at least one contaminated preamble signal among the plurality of preamble signals, and detecting a peak value of the combined preamble signals.

While the disclosure has been described in detail with reference to specific embodiments, it is to be understood that various changes and modifications may be made without departing from the scope of the disclosure. Therefore, the scope of the disclosure should not be limited by embodiments described herein, but should be determined by the scope of the appended claims and equivalents thereof.

The invention claimed is:

1. A preamble signal detection method performed by a receiving device in a wireless communication system, the method comprising:

repeatedly receiving a plurality of preamble signals for random access through a physical random access channel (PRACH);

determining at least one contaminated preamble signal among the received plurality of preamble signals;

combining remaining preamble signals excluding the at least one contaminated preamble signal among the plurality of preamble signals;

detecting a peak value of the combined preamble signals, inserting a correction time value for correcting a data transmission time point of a transmitting device, which is determined based on the detected peak value, in a random access response (RAR) signal which is a response signal of the preamble signal; and transmitting the RAR signal to the transmitting device.

2. The method of claim 1, wherein the determining the at least one contaminated preamble signal includes:

determining a first preamble signal as the at least one contaminated preamble signal, in case that signal strength of the first preamble signal among the plurality of preamble signals is greater than a first threshold value.

3. The method of claim 2, wherein the determining the at least one contaminated preamble signal includes:

determining whether a difference between the signal strength of the first preamble signal and average signal strength of the plurality of preamble signals is greater than a second threshold value, in case that the signal strength of the first preamble signal is greater than the first threshold value; and determining the first preamble signal as the at least one contaminated preamble signal, in case that the difference between the signal strength of the first preamble signal and the average signal strength is greater than the second threshold value.

4. The method of claim 1, wherein the determining the at least one contaminated preamble signal includes:
calculating average signal strength of the plurality of preamble signals; and
determining a second preamble signal as the at least one contaminated preamble signal, when a difference between signal strength of the second preamble signal among the plurality of preamble signals and the average signal strength is greater than a second threshold value, and
wherein the calculating the average signal strength of the plurality of preamble signals includes:
calculating the average signal strength of a plurality of preamble signals having the signal strength smaller than a first threshold value.

5. The method of claim 1, wherein the determining the at least one contaminated preamble signal includes:
determining a third preamble signal as the at least one contaminated preamble signal, in case that noise strength of the third preamble signal among the plurality of preamble signals is greater than a third threshold value.

6. The method of claim 1, wherein the determining the at least one contaminated preamble signal includes:
calculating average noise strength of the plurality of preamble signals; and
determining a fourth preamble signal as the at least one contaminated preamble signal, in case that a difference between noise strength of the fourth preamble signal among the plurality of preamble signals and the average noise strength is greater than a fourth threshold value.

7. The method of claim 1, wherein the determining the at least one contaminated preamble signal includes:
determining the at least one contaminated preamble signal based on a signal strength value of each of the plurality of preamble signals or a noise strength value of each of the plurality of preamble signals.

8. A device detecting a preamble signal in a wireless communication system, the device comprising:
a receiver configured to repeatedly receive a plurality of preamble signals for random access through a physical random access channel (PRACH);
an interference signal checker configured to determine at least one contaminated preamble signal among the received plurality of preamble signals;
a combiner configured to combine remaining preamble signals excluding the at least one contaminated preamble signal among the plurality of preamble signals;
a peak detector configured to detect a peak value of the combined preamble signals; and
a transmitter configured to insert a correction time value for correcting a data transmission time point of a transmitting device, which is determined based on the detected peak value, in a random access response (RAR) signal which is a response signal of the preamble signal, and to transmit the RAR signal to the transmitting device.

9. The device of claim 8, wherein the interference signal checker is further configured to:
determine a first preamble signal as the at least one contaminated preamble signal, in case that signal strength of the first preamble signal among the plurality of preamble signals is greater than a first threshold.

10. The device of claim 9, wherein the interference signal checker is further configured to:
determine whether a difference between the signal strength of the first preamble signal and average signal strength of the plurality of preamble signals is greater than a second threshold value, in case that the signal strength of the first preamble signal is greater than the first threshold value, and
determine the first preamble signal as the at least one contaminated preamble signal, in case that the difference between the signal strength of the first preamble signal and the average signal strength is greater than the second threshold value.

11. The device of claim 8, wherein the interference signal checker is further configured to:
calculate average signal strength of the plurality of preamble signals, and
determine a second preamble signal as the at least one contaminated preamble signal, in case that a difference between signal strength of the second preamble signal among the plurality of preamble signals and the average signal strength is greater than a second threshold, and
wherein the interference signal checker is configured to:
calculate the average signal strength of a plurality of preamble signals having the signal strength smaller than a first threshold value.

12. The device of claim 8, wherein the interference signal checker is further configured to:
determine a third preamble signal as the at least one contaminated preamble signal, in case that noise strength of the third preamble signal among the plurality of preamble signals is greater than a third threshold value, or
wherein the interference signal checker is further configured to:
calculate average noise strength of the plurality of preamble signals, and
determine a fourth preamble signal as the at least one contaminated preamble signal, in case that a difference between noise strength of the fourth preamble signal among the plurality of preamble signals and the average noise strength is greater than a fourth threshold value.

13. The device of claim 8, wherein the interference signal checker is further configured to:
determine the at least one contaminated preamble signal based on a signal strength value of each of the plurality of preamble signals or a noise strength value of each of the plurality of preamble signals.

\* \* \* \* \*